United States Patent [19]

Imai

[11] 4,264,138
[45] Apr. 28, 1981

[54] PHOTOGRAPHIC LENS SYSTEM

[75] Inventor: Toshihiro Imai, Hachiouji, Japan

[73] Assignee: Olympus Optical Co., Ltd., Tokyo, Japan

[21] Appl. No.: 947,161

[22] Filed: Sep. 28, 1978

[30] Foreign Application Priority Data

Oct. 1, 1977 [JP] Japan ............... 52-118501

[51] Int. Cl.³ .................................... G02B 9/60
[52] U.S. Cl. ........................................ 350/467
[58] Field of Search .......................... 350/218

[56] References Cited

U.S. PATENT DOCUMENTS

| | | | |
|---|---|---|---|
| 2,720,139 | 10/1955 | Tronnier | 350/218 |
| 4,045,127 | 8/1977 | Matsubara | 350/218 |
| 4,106,854 | 9/1978 | Fuji | 350/218 |

*Primary Examiner*—Conrad J. Clark
*Attorney, Agent, or Firm*—Cushman, Darby & Cushman

[57] ABSTRACT

A photographic lens system having five lens components in which separation of a cemented lens of the second lens component of the Biometer type lens system has enabled making an aperture ratio of F/2.0, a long back focus and effective correction of various aberrations. The system comprises five lens components and five lens elements comprising a first lens component having a positive meniscus lens, a second lens component having positive meniscus lens, a third lens component having a negative meniscus lens, a fourth lens component having a negative meniscus lens and fifth lens component having a positive meniscus lens.

3 Claims, 3 Drawing Figures

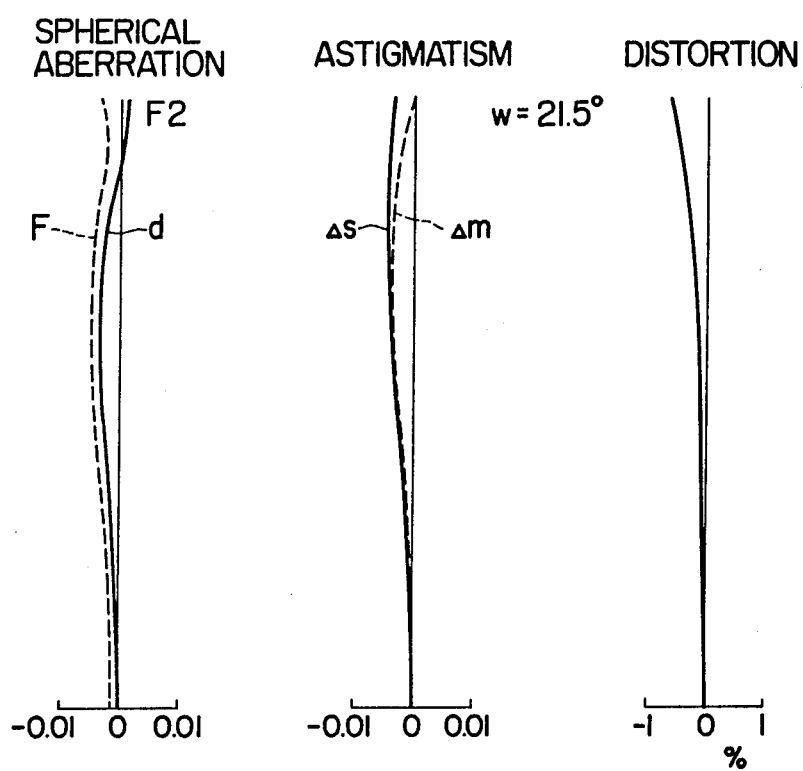

PHOTOGRAPHIC LENS SYSTEM

FIELD OF THE INVENTION

The present invention relates to a photographic lens system and more particularly, to a photographic lens system which has a small number of lens elements and so is economical but is still photographically effective.

DESCRIPTION OF THE PRIOR ART

A typical conventional lens system which has a comparatively small number of lens elements is a Biometer type lens system in which the lens positioned at the back of the diaphragm is not a cemented lens, unlike in a Gauss type lens system but is a single lens. A conventional lens of this type is of F/3.5 and is of small aperture ratio. A lens with an aperture ratio in the order of F/1.8 has existed but is not suitable for a single-lens reflex camera because the back focus is too short. A lens which has a long back focus and is yet adapted to a large aperture ratio has existed but such a lens coprises six lens elements, thus falling short of meeting the object of reducing the number of lens elements. It is thus very difficult for a Biometer type lens system having a small number of lens elements (i.e., five elements) to be designed to have a long back focus and to be adapted to a large aperture ratio.

SUMMARY OF THE INVENTION

It is an object of the present invention to provide a photographic lens system having five lens components in which separation of a cemented lens of the second lens component of the Biometer type lens system has enabled making an aperture ratio of F/2.0, a long back focus and effective correction of various aberrations.

A photographic lens system according to the present invention comprises a first lens component of a positive meniscus lens having its convex surface faced to the object side, a second lens component of a positive meniscus lens having its convex surface faced to the object side, a third lens component of a negative meniscus lens having its convex surface faced to the object side, a fourth lens component of a negative meniscus lens having its convex surface faced to the image side, and fifth lens component of a positive meniscus lens having its convex surface faced to the image side.

Further objects and advantages will be apparent in the arrangements as set forth in the following specification taken together with the accompanying drawings.

DESCRIPTION OF THE DRAWINGS

FIGS. 2 and 3 show graphs illustrating aberration curves of embodiments 1 and 2, respectively, of the present invention.

DESCRIPTION OF THE PREFERRED EMBODIMENTS

Figure 1:
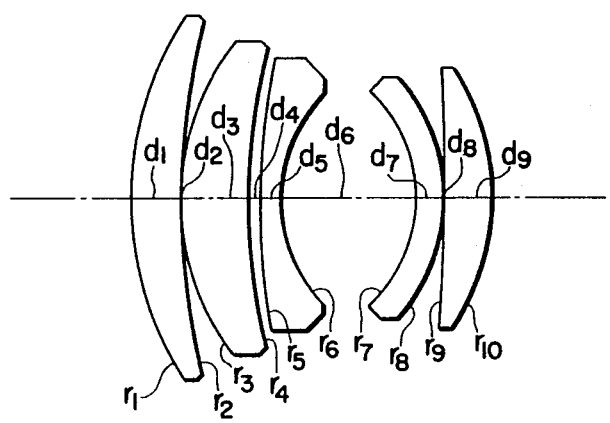
FIG. 1 shows a sectional view of a photographic lens system of the present invention.
Figure 2:
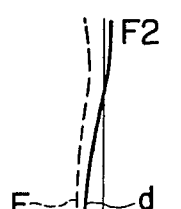
Figure 2:
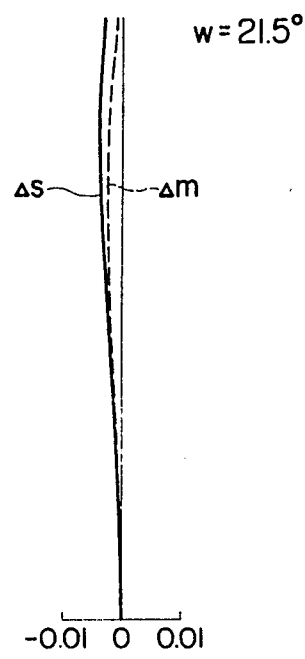
Figure 2:

A photographic lens system of the present invention comprises, as shown in FIG. 1, five lens components consisting of five separate lens elements comprising a first lens component having a positive meniscus lens, a second lens component having positive meniscus lens, a third lens component having a negative meniscus lens, a fourth lens component having a negative meniscus lens and fifth lens component having a positive meniscus lens. This lens system satisfies each of the conditions enumerated below:

$$-0.2/f < \phi < -0.1/f \qquad (1)$$
$$[\phi = (1 - n_2)\frac{1}{r_4} + (n_3 - 1)\frac{1}{r_5}]$$

$$d_4 < 0.025f \qquad (2)$$

$$0.2f < d_6 < 0.24f \qquad (3)$$

$$d_7 < 0.04f \qquad (4)$$

$$0.9d_6 < (r_6 - r_7)/2 < 1.1d_6 \qquad (5)$$

$$1.2 < r_8/r_7 < 1.4 \qquad (6)$$

$$15 < \nu_2 - \nu_3 < 25 \qquad (7)$$

wherein the reference symbol f represents an equivalent focal length of the total system, $r_4$ represents radius of curvature of the surface on the image side of the second lens component, $r_5$ and $r_6$ represents radii of curvature of both the surfaces of the third lens component, $r_7$ and $r_8$ represent radii of curvature of both the surfaces of the fourth lens component, $d_7$ represents the thickness of the fourth lens component, $d_4$ represents the air space between the second lens component and third lens component, $d_6$ represents the air space between the third lens component and the fourth lens component, $n_2$ and $n_3$ represents refractive indices of the second lens component and the third lens component, respectively, and $\nu_2$ and $\nu_3$ represents Abbe's numbers of the second lens component and the third lens component, respectively.

Next, the reasons for establishing the upper limit and lower limit for the above-mentioned conditions are hereinafter explained in detail.

Under condition (1), when $\phi$ exceeds the upper limit of $-1/f$, a bulging of a spherical aberration (on a graphical display) becomes large and a higher order spherical aberration occurs. When $\phi$ is below the lower limit of $-0.2/f$, the longitudinal chromatic aberration and the lateral chromatic aberration become unbalanced.

Under condition (2), when $d_4$ exceeds 0.024f, the longitudinal chromatic aberration and the lateral chromatic aberration become unbalanced.

Under condition (3), when $d_6$ becomes smaller than 0.2f, the curvature of field becomes large and, when it becomes larger than 0.24f, symmetry of off-axis coma becomes unsatisfactory and, further, the total length of the lens system becomes too long.

Under condition (4), when $d_7$ is larger than 0.04f, the astigmatism is increased and the back focus $f_B$ becomes short, thereby rendering the lens to be unsuitable for use as a single-lens reflex camera lens.

Under condition (5), when $(r_6 - r_7)/2$ is smaller than $0.9d_6$, a bulging of spherical aberration (on a graphical display) becomes large and symmetry of off-axis coma becomes unsatisfactory whereas when $(r_6 - r_7)/2$ becomes larger than $1.1d_6$, symmetry of off-axis coma becomes aggravated.

Under condition (6), when $r_8/r_7$ is smaller than 1.2, the back focus becomes short and, when it is larger than 1.4, symmetry of off-axis coma becomes aggravated.

Under conditions (7), when $\nu_2\nu_3$ is smaller than 15, chromatic aberration becomes undercorrected and the same is larger than 25, chromatic aberration becomes overcorrected, neither of which is uncorrectable by the two lenses positioned at the back of a diaphragm.

When the air space $d_4$ between the second lens component and the third lens component as shown under condition (2) is smaller than 0.004f, the space between the two lenses becomes too narrow, so that it necessitates the diameter of the lens to be made smaller and that it becomes impossible for the lens to have a sufficiently effective diameter and to meet the required large aperture ratio. When the thickness $d_7$ of the fourth lens component under conditions (4) is 0.03f, the thickness of the lens becomes too thin, which is undesirable since it is difficult to make such a lens. For the foregoing reasons, it is desirable for $d_4$ and $d_7$ to be $d_4 > 0.004f$ and $d_7 > 0.03f$, respectively.

Now, some preferred embodiments to the present invention relating the photographic lens system as described are given below:

Embodiment 1

| | | |
|---|---|---|
| $r_1 = 0.5112$ | | |
| $d_1 = 0.078$ | $n_1 = 1.72$ | $v_1 = 50.25$ |
| $r_2 = 1.0980$ | | |
| $d_2 = 0.002$ | | |
| $r_3 = 0.3700$ | | |
| $d_3 = 0.101$ | $n_2 = 1.6935$ | $v_2 = 53.23$ |
| $r_4 = 0.9709$ | | |
| $d_4 = 0.020$ | | |
| $r_5 = 1.1157$ | | |
| $d_5 = 0.030$ | $n_3 = 1.6727$ | $v_3 = 32.10$ |
| $r_6 = 0.2217$ | | |
| $d_6 = 0.216$ | | |
| $r_7 = -0.2055$ | | |
| $d_7 = 0.038$ | $n_4 = 1.78472$ | $v_4 = 25.71$ |
| $r_8 = -0.2680$ | | |
| $d_8 = 0.002$ | | |
| $r_9 = -3.3321$ | | |
| $d_9 = 0.076$ | $n_5 = 1.617$ | $v_5 = 62.79$ |
| $r_{10} = -0.3409$ | | |
| $f = 1$ | $f_B = 0.687$ | $\phi = -0.111$ |
| $\frac{r_6 - r_7}{2} = 0.99 d_6$ | | $r_8/r_7 = 1.304$ |
| $v_2 - v_3 = 21.13$ | | $\Sigma d = 0.562$ |

Embodiment 2

| | | |
|---|---|---|
| $r_1 = 0.5048$ | | |
| $d_1 = 0.083$ | $n_1 = 1.72$ | $v_1 = 50.25$ |
| $r_2 = 1.1102$ | | |
| $d_2 = 0.005$ | | |
| $r_3 = 0.3907$ | | |
| $d_3 = 0.089$ | $n_2 = 1.7432$ | $v_2 = 49.41$ |
| $r_4 = 1.0657$ | | |
| $d_4 = 0.007$ | | |
| $r_5 = 1.3235$ | | |
| $d_5 = 0.053$ | $n_3 = 1.6727$ | $v_3 = 32.1$ |
| $r_6 = 0.2256$ | | |
| $d_6 = 0.217$ | | |
| $r_7 = -0.2079$ | | |
| $d_7 = 0.037$ | $n_4 = 1.78472$ | $v_4 = 25.71$ |
| $r_8 = -0.2700$ | | |
| $d_8 = 0.002$ | | |
| $r_9 = -2.9090$ | | |
| $d_9 = 0.076$ | $n_5 = 1.617$ | $v_5 = 62.79$ |
| $r_{10} = -0.3415$ | | |
| $f = 1$ | $f_B = 0.687$ | $\phi = -0.189$ |
| $\frac{r_6 - r_7}{2} = d_6$ | | $r_8/r_7 = 1.3$ |
| $v_2 - v_3 = 17.31$ | | $\Sigma d = 0.568$ | wherein the reference symbol f represents an equivalent focal length of the total system, the reference symbols $r_1$ through $r_{10}$ represent radii of curvature of the respective surfaces of the lenses, the reference symbols $d_1$ through $d_9$ represent thicknesses of the respective lenses and air spaces therebetween, the reference symbols $n_1$ through $n_5$ represent refractive indices of the respective lenses, and the reference symbols $v_1$ through $v_5$ represent Abbe's numbers of the respective lenses.

I claim:

1. A photographic lens system comprising a first lens component of a positive meniscus lens having its convex surface faced to the object side, a second lens component of a positive meniscus lens having its convex surface faced to the object side, a third lens component of a negative meniscus lens having its convex surface faced to the object side, a fourth lens component of a negative meniscus lens having its convex surface faced to the image side, and fifth lens component of a positive meniscus lens having its convex surface faced to the image side, said lens system satisfying the following conditions:

$$-0.2/f < \phi < -0.1/f \quad (1)$$
$$[\phi = (1 - n_2)\frac{1}{r_4} + (n_3 - 1)\frac{1}{r_5}]$$

$$0.004f < d_4 < 0.025f \quad (2)$$

$$0.2f < d_6 < 0.24f \quad (3)$$

$$0.03f < d_7 < 0.04f \quad (4)$$

$$0.9 d_6 < (r_6 - r_7)/2 < 1.1 d_6 \quad (5)$$

$$1.2 < r_8/r_7 < 1.31 \quad (6)$$

$$15 < v_2 - v_3 < 25 \quad (7)$$

wherein the reference symbol f represents an equivalent focal length of the total lens system, $r_4$ represents radius of curvature of the surface on the image side of the second lens component, $r_5$ and $r_6$ represent radii of curvature of both the surfaces of the third lens component, $r_7$ and $r_8$ represent radii of curvature of both the surfaces of the fourth lens component, $d_4$ represents the air space between the second lens component and third lens component, $d_6$ represents the air space between the third lens component and the fourth lens component, $d_7$ represents the thickness of the fourth lens component, $n_2$ and $n_3$ represents refractive indices of the second lens component and the third lens component, respectively, and $v_2$ and $v_3$ represents Abbe's numbers of the second lens component and the third lens component, respectively.

2. A photographic lens system according to claim 1, further having the following numerical data:

| | | |
|---|---|---|
| $r_1 = 0.5112$ | | |
| $d_1 = 0.078$ | $n_1 = 1.72$ | $v_1 = 50.25$ |
| $r_2 = 1.0980$ | | |
| $d_2 = 0.002$ | | |
| $r_3 = 0.3700$ | | |
| $d_3 = 0.101$ | $n_2 = 1.6935$ | $v_2 = 53.23$ |
| $r_4 = 0.9709$ | | |
| $d_4 = 0.020$ | | |
| $r_5 = 1.1157$ | | |
| $d_5 = 0.030$ | $n_3 = 1.6727$ | $v_3 = 32.10$ |
| $r_6 = 0.2217$ | | |
| $d_6 = 0.216$ | | |
| $r_7 = -0.2055$ | | |
| $d_7 = 0.038$ | $n_4 = 1.78472$ | $v_4 = 25.71$ |
| $r_8 = -0.2680$ | | |
| $d_8 = 0.002$ | | |
| $r_9 = -3.3321$ | | |
| $d_9 = 0.076$ | $n_5 = 1.617$ | $v_5 = 62.79$ |
| $r_{10} = -0.3409$ | | |

-continued

| | | |
|---|---|---|
| f = 1 | $f_B = 0.687$ | $\phi = -0.111$ |
| $\frac{r_6 - r_7}{2} = 0.99 d_6$ | | $r_8/r_7 = 1.304$ |
| $v_2 - v_3 = 21.13$ | | $\Sigma d = 0.562$ | wherein the reference symbols $r_1$ through $r_{10}$ represent radii of curvature of respective surfaces of the lenses, $d_1$ through $d_9$ represent thicknesses of respective lenses and air spaces therebetween, $n_1$ through $n_5$ represent refractive indices of the respective lenses, and $v_1$ through $v_5$ represent Abbe's numbers of the respective lenses.

3. A photographic lens system according to claim 1, further having the following numerical data:

| | | |
|---|---|---|
| $r_1 = 0.5048$ | | |
| $d_1 = 0.083$ | $n_1 = 1.72$ | $v_1 = 50.25$ |
| $r_2 = 1.1102$ | | |
| $d_2 = 0.005$ | | |
| $r_3 = 0.3907$ | | |
| $d_3 = 0.089$ | $n_2 = 1.7432$ | $v_2 = 49.41$ |

-continued

| | | |
|---|---|---|
| $r_4 = 1.0657$ | | |
| $d_4 = 0.007$ | | |
| $r_5 = 1.3235$ | | |
| $d_5 = 0.053$ | $n_3 = 1.6727$ | $v_3 = 32.1$ |
| $r_6 = 0.2256$ | | |
| $d_6 = 0.217$ | | |
| $r_7 = -0.2079$ | | |
| $d_7 = 0.037$ | $n_4 = 1.78472$ | $v_4 = 25.71$ |
| $r_8 = -0.2700$ | | |
| $d_8 = 0.002$ | | |
| $r_9 = -2.9090$ | | |
| $d_9 = 0.076$ | $n_5 = 1.617$ | $v_5 = 62.79$ |
| $r_{10} = -0.3415$ | | |
| f = 1 | $f_B = 0.687$ | $\phi = -0.189$ |
| $\frac{r_6 - r_7}{2} = d_6$ | | $r_8/r_7 = 1.3$ |
| $v_2 - v_3 = 17.31$ | | $\Sigma d = 0.568$ | wherein the reference symbols $r_1$ through $r_{10}$ represent radii of curvature of respective surfaces of the lenses, $d_1$ through $d_9$ represent thicknesses of respective lenses and air spaces therebetween, $n_1$ through $n_5$ represent refractive indices of the respective lenses, and $v_1$ through $v_5$ represent Abbe's numbers of the respective lenses.

* * * * *